(12) United States Patent
Tiberghien et al.

(10) Patent No.: US 8,356,632 B2
(45) Date of Patent: Jan. 22, 2013

(54) MANIFOLD FOR DISTRIBUTING OR FOR COLLECTING FLUID, AND A MOLDING INSTALLATION INCLUDING SUCH A MANIFOLD

(75) Inventors: Alain-Christophe Tiberghien, Sevrier (FR); Christophe Durieux, Gilly sur Isere (FR); Stephane Emeyriat, Marcellaz-Albanais (FR)

(73) Assignee: Staubli Faverges, Faverges (FR)

( * ) Notice: Subject to any disclaimer, the term of this patent is extended or adjusted under 35 U.S.C. 154(b) by 473 days.

(21) Appl. No.: 12/767,936

(22) Filed: Apr. 27, 2010

(65) Prior Publication Data

US 2010/0278951 A1    Nov. 4, 2010

(30) Foreign Application Priority Data

Apr. 30, 2009   (FR) ...................................... 09 02118

(51) Int. Cl.
*F16L 39/06*   (2006.01)
(52) U.S. Cl. ..................... 137/884; 137/561 A; 285/185
(58) Field of Classification Search .................. 137/884, 137/561 A; 285/185, 190
See application file for complete search history.

(56) References Cited

U.S. PATENT DOCUMENTS

| | | | | | |
|---|---|---|---|---|---|
| 978,323 | A | * | 12/1910 | Mellin et al. | 105/39 |
| 1,765,693 | A | * | 6/1930 | Muend | 285/181 |
| 1,974,402 | A | * | 9/1934 | Templeton | 165/72 |
| 2,083,970 | A | | 6/1937 | Walter | |

FOREIGN PATENT DOCUMENTS

| | | |
|---|---|---|
| AU | 604748 A1 | 1/1991 |
| AU | B-78222/87 | 1/1991 |
| EP | 2014991 | 1/2009 |
| GB | 1274224 | 5/1972 |

* cited by examiner

*Primary Examiner* — John Fox
(74) *Attorney, Agent, or Firm* — Dowell & Dowell, PC (57) ABSTRACT

This manifold comprises a stack formed by at least a plurality of tubular modules and a first support, and at least one tie for compressing the stack in a configuration in which central internal volumes of the various modules are in mutual communication, with adjacent parts of the stack overlapping in leaktight manner, and in which the relative position of two adjacent modules is stationary. The tie may be fastened in rotation about its longitudinal axis and in translation parallel to said axis, relative to the first support. The tie is equipped with a clamping nut that, in the tightened position, exerts a compression force on the stack of modules and on the first support. An abutment, suitable for being fastened axially relative to the first support and for bearingly receiving a surface of the clamping nut when said clamping nut is actuated in the loosening direction, is disposed, relative to the surface of the clamping nut in the tightened position, at an axial distance less than the smallest of the leaktight overlap lengths of two adjacent parts of the stack.

11 Claims, 7 Drawing Sheets

MANIFOLD FOR DISTRIBUTING OR FOR COLLECTING FLUID, AND A MOLDING INSTALLATION INCLUDING SUCH A MANIFOLD

The invention relates to a manifold for distributing or for collecting a fluid, and to a molding installation including such a manifold.

In the field of molding installations, it is known to use a manifold to distribute fluid, such as a heat-transfer liquid, between one or more inlets and one or more outlets designed to be connected to a plurality of points at which the heat-transfer fluid is used in particular for heating one or more portions of a mold to a given temperature and for maintaining said portion(s) at said given temperature.

In the field of plumbing, it is known from U.S. Pat. No. 4,848,391 that a manifold can be implemented by stacking juxtaposed modules whose respective internal volumes form a central duct and that are equipped with radial outlets. Those modules are assembled together by means of ties, i.e. retaining rods, each of which is threaded at least one of its two ends, those ties exerting a compression force on the stack of modules making it possible to lock and to seal the assembly of the modules. Each module can be disposed in three different angular configurations. When the configuration of the manifold is to be modified, i.e. when the relative angular positioning of certain modules is to be modified, it is necessary to remove the ties, and then to cause the modules to move relative to each other, thereby making it necessary to break the sealing of the manifold. That involves emptying the fluid network to which the manifold is connected. That drawback is not problematic in the field of delivering drinking water in a building, insofar as a manifold is generally installed for several tens of years, without its configuration being changed subsequently. That drawback is however completely unacceptable in certain fields in which it must be possible for the configuration of a manifold to be modified while it is in use.

In the field of molding installations and in other technical fields, it can be necessary for the configuration of a manifold to be modified, e.g. in the event that the mold equipping a press needs to be changed. That applies when the orientation of the hoses that connect the manifold to certain portions of the mold is to be adjusted, insofar as it is desirable to reduce the zones of high curvature of the hoses, and to take account of the obstacles that might find themselves in the path of a hose. With known equipment, it is necessary to empty the system for feeding the mold with heat-transfer fluid prior to acting on the manifold for the purpose of modifying its configuration, and then to fill said manifold again. Those operations are lengthy and require qualified staff, which is economically disadvantageous.

Technical problems of the same order arise in other fields of use of a manifold for distributing or for collecting fluid, whenever it is necessary for its configuration to be modifiable after it is put into service for the first time.

More particularly, an object of the invention is to remedy those drawbacks by proposing a novel manifold that is easier and less expensive to adapt to accommodate its conditions of use.

To this end, the invention provides a manifold for distributing or for collecting fluid, said manifold comprising a stack formed by at least a plurality of tubular modules and a first support, and at least one tie for compressing the stack in a configuration in which central internal volumes of the various modules are in mutual communication, with adjacent parts of the stack overlapping in leaktight manner, and in which the relative position of two adjacent modules is stationary. This manifold is characterized in that the tie is suitable for being fastened, in rotation about its longitudinal axis and in translation parallel to said axis, relative to the first support, while, at one end, the tie is equipped with a clamping nut that, in the tightened position, exerts a compression force on the stack of modules and on the first support, and while an abutment, suitable for being fastened axially relative to the first support and for bearingly receiving a surface of the clamping nut when said clamping nut is actuated in the loosening direction, is disposed, relative to the surface of the clamping nut in the tightened position, at an axial distance less than the smallest of the leaktight overlap lengths of two adjacent parts of the stack.

By means of the invention, the abutment makes it possible for the nut to be loosened partially into a configuration in which the relative position of two adjacent modules can be adjusted, without having to disassemble the manifold completely, and in particular without any risk of loss of leaktightness between two adjacent modules because the loosening stroke has a length less than the minimum spacing length over which two adjacent parts in the stack overlap in leaktight manner. The invention thus makes it possible to adapt the manifold to accommodate its conditions of use, without firstly having to empty a fluid circulation system of which the manifold is part.

In the present application, the terms "axial", "radial", "axially", and "radially", and the other analogous terms relate to a longitudinal axis of the manifold, unless otherwise specified. Thus, for example, an axial dimension is measured parallel to said axis, and a radial surface surrounds said axis.

In advantageous but non-essential aspects of the invention, such a manifold may incorporate one or more of the following characteristics, taken in any technically feasible combination:

- the surface of the clamping nut bears against the abutment in a position in which the modules can turn, relative to the support and/or relative to one another, about an axis parallel to the longitudinal axis of the tie, while the adjacent parts of the stack overlap in leaktight manner;
- the leaktight overlap between two adjacent parts is implemented by an outer annular skirt of a first part surrounding an inner annular skirt of a second part adjacent to the first part, with at least one seal being interposed by being disposed in a groove provided in one of the radial surfaces facing the outer skirt and the inner skirt;
- the tie is disposed inside the internal volume of the manifold and passes through the internal volumes of the various modules;
- the stack further comprises a second support suitable for being fastened relative to the first support, and the abutment is secured to the second support, at least parallel to the longitudinal axis of the tie;
- a cap mounted on the second support is provided with an orifice for passing the clamping nut, the abutment is formed by a seat provided around the orifice, on the side of the cap that faces towards the second support, and said seat is suitable for bearingly receiving a radially outer collar of said nut;
- the clamping nut is screwed into a locknut that is held stationary in rotation about the axis of rotation of the clamping nut;
- the manifold further comprises a third support for the tie, which support is disposed in an intermediate portion of the manifold, within the stack of modules;
- the first support, and optionally the second support and/or the third support is/are provided with means for fastening to a supporting structure; and the tie is mounted on the first support by means of an assembly nut screwed onto the tie, of polygonal outside shape and that is held stationary by complementary shapes in a corresponding recess in the first support, and by means of a holding nut screwed onto the tie and suitable for acting, with the assembly nut, to exert a pinching force for pinching a portion of the first support between these two nuts.

The invention also provides a molding installation comprising at least one mold fed with heat-transfer fluid by a fluid circulation system, said installation further comprising at least one manifold as mentioned above that is fastened to a supporting structure.

Such an installation is easier and less expensive use than state of the art installations.

The invention can be better understood and other advantages of the invention appear more clearly from the following description of three embodiments of a manifold and of a molding installation that comply with the principle of the invention, the description being given merely by way of example and with reference to the accompanying drawings, in which.

Figure 1:
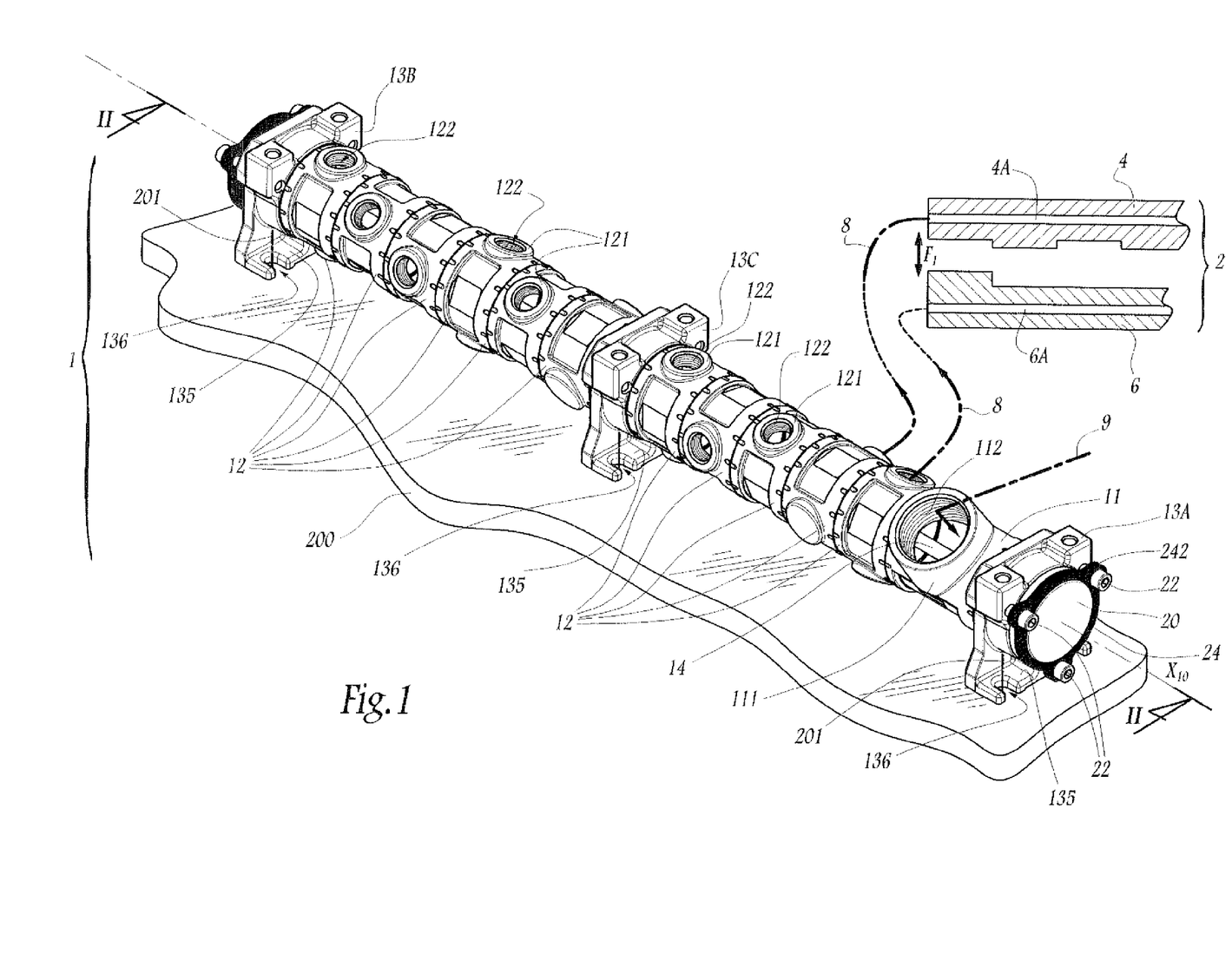
FIG. 1 is a perspective view of a manifold of the invention that is used in a molding installation that is shown in fragmentary and diagrammatic manner.

The installation 1 that is shown in fragmentary and diagrammatic manner in FIG. 1 comprises a mold 2 having a punch 4 and a cavity 6 that are mounted to move relative to each other as indicated by the double-headed arrow $F_1$, and that are designed to mold a plastics material. In order to maintain the plastics material at a temperature suitable for it to be molded, the punch 4 and the cavity 6 are equipped with respective ducts 4A, 6A through which a heat-transfer fluid heated to a suitable temperature flows.

The ducts 4A and 6A are fed with a heat-transfer fluid via hoses 8 that are represented by lines indicating their axes, and that are connected to a manifold 10.

In practice, the installation 1 comprises a plurality of molds of the same type as the mold 2, and the manifold 10 makes it possible to feed various ducts equipping the punches and cavities of the various molds, it being recalled that any one punch or cavity may be equipped with a plurality of such ducts.

The manifold 10 is formed by stacking a plurality of modules along an axis $X_{10}$ that constitutes a longitudinal axis of the manifold 10.

The manifold 10 includes an inlet module 11 made of die-stamped steel and that defines a branch stub 111 extending radially relative to the axis $X_{10}$ and having an inside wall provided with a thread 112. It is thus possible to screw a feed duct 9 into the branch stub 111 for the purpose of feeding the manifold 10 with heat-transfer liquid, said duct 9 being represented by a line indicating its axis.

The manifold 10 also includes eleven outlet modules 12 that are identical, that are made of die-stamped steel, and that make it possible to distribute the fluid that is inside the internal volume $V_{10}$ of the manifold 10 between eleven distinct points of use.

Each module 12 is equipped with a branch stub 121 extending radially relative to the axis $X_{10}$ and having an inside wall provided with a thread 122 into which the end of a hose 8 provided for this purpose can be screwed.

Figure 2:
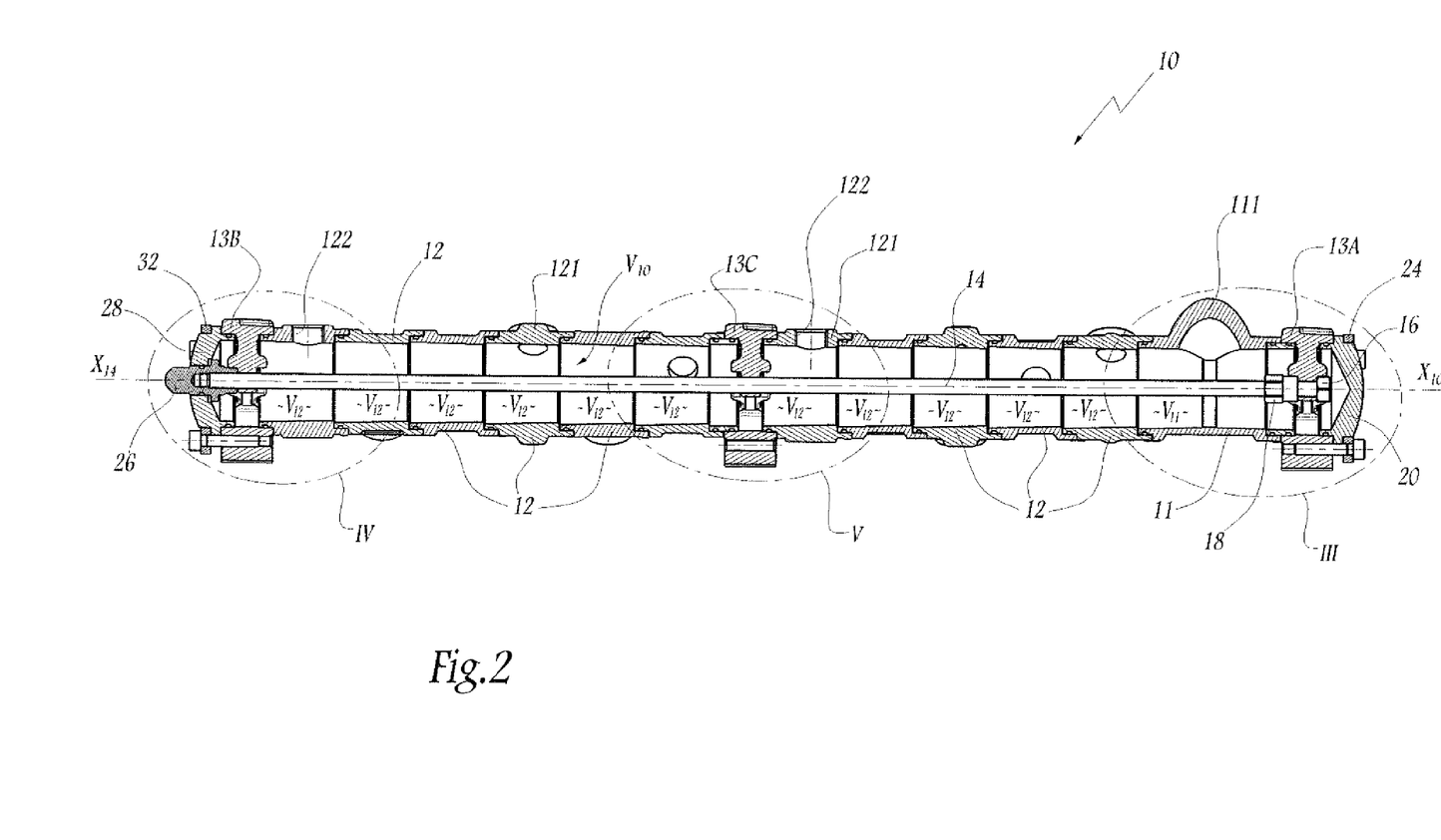
FIG. 2 is a section view of the manifold on line II-II of FIG. 1.

As appears more particularly in FIG. 2, each module 11 or 12 is tubular and its internal volume $V_{11}$, $V_{12}$ communicates with the internal volume of an adjacent module.

In addition to the modules 11 and 12, the manifold 10 includes three supports 13A, 13B, and 13C that are identical and that are steel castings.

The internal volume $V_{10}$ of the manifold 10 comprises the internal volumes $V_{11}$ and $V_{12}$ and the internal volumes of the supports 13A, 13B, and 13C.

The manifold 10 also includes a tie 14 whose longitudinal axis $X_{14}$ coincides with the axis $X_{10}$ when the manifold is in the assembled configuration. The tie 14 extends inside the volumes $V_{11}$ and $V_{12}$, and inside the volumes of the supports 13A, 13B, and 13C, so that it is mechanically protected from the outside environment over most of its length.

A first threaded end 142 of the tie 14 is held stationary on the support 13A. An assembly nut 16 is screwed onto the end 142 and is received in a recess 131 formed in a central rib 132 of the support 13A. The section of the recess 131 taken perpendicularly to the axis $X_{10}$ is hexagonal and complementary to the outside section of the assembly nut 16, so that said nut received in said recess is held stationary in rotation about the axes $X_{10}$ and $X_{14}$ that then coincide.

In addition, a holding nut 18 is screwed onto the tie 14, in the vicinity of its end 142, and is provided with a skirt 182 of circular section that is engaged in a recess 133 formed by the rib 132, on its side opposite from the recess 131. An orifice 134 of circular section interconnects the recesses 131 and 133 through the rib 132. This orifice 134 has a diameter slightly greater than the diameter of the end 142 of the tie 14 that passes through it.

Thus, it is possible to screw the holding nut 18 onto the tie 14 and then to engage the end 142 into the recess 134 before screwing the assembly nut 16 onto the end 142. It is then possible to engage the assembly nut 16 into the recess 131, so that the assembly nut 16 is held stationary in rotation about the axis $X_{10}$. It is then possible to tighten the holding nut 18 onto the tie 14, towards the assembly nut 16, thereby causing its skirt 182 to penetrate into the recess 133 until a pinching force $E_1$ is exerted by the assembly nut 16 and by the holding nut 18 on the rib 132. The tie 14 is then firmly held stationary relative to the support 13A both in rotation and in translation relative to the axis $X_{10}$.

A cap 20 is mounted on the support 13A by means of three screws 22. This cap 20 forms an end stopper for the manifold 10.

An identifier ring 24 is mounted about the cap 20 and is provided with three lugs 242 that are provided with orifices through which the screws 22 pass, thereby making it possible to hold the ring 24 in position and visible from the outside on the manifold 10. The ring 24 is colored, thereby making it possible to identify, for example, the type or the temperature of the fluid going through the manifold 10. Thus, the ring 24 may be red in color when the fluid going through the manifold 10 has a temperature higher than a predetermined value, e.g. 200° C., and blue in color when said fluid has a temperature lower than said predetermined value.

At the end of the manifold 10 that is opposite from the support 13A, the support 13B supports the second threaded ends 144 of the ties 14. This end 144 passes, with clearance, through the orifice 134 in the support 13B that extends between the recesses 131 and 133 formed by the internal rib 132 of the support 13B.

A blind clamping nut 26 is screwed onto the end 144 and is provided with an annular skirt 262 of circular section that is engaged in the recess 133. The clamping nut 26 is also provided with a radially outer collar 264 and with a polygonal portion 266 that enables the clamping nut to be driven by using an appropriate wrench in order to drive it in rotation about the coinciding axes $X_{10}$ and $X_{14}$. As appears from the following explanations, the clamping nut 26 makes it possible to exert a compression force on the stack of modules 11 and 12 and of supports 13A, 13B, and 13C, thereby making it possible to hold the manifold in the stacked and compressed configuration that is shown in FIGS. 1 to 7.

A cap 28 is held stationary on the support 135 by means of three screws 30 that are identical to the screws 22. In a manner analogous to the ring 24, a colored ring 32 is used to identify the type of fluid passing through the manifold 10. The rings 24 and 32 may have identical or different colors, as a function of the identification conventions used. A manifold with one or more rings of red color is thus used on the feed circuit for feeding the mold portions with a "hot" heat-transfer fluid, under which circumstances the manifold 10 operates as a distributor. Under circumstances when the manifold operates as a collector of a "cold" heat-transfer liquid coming from the various molds 2, the manifold may be equipped with rings 24 and 32 that are blue in color.

The cap 28 is provided with an orifice 282 for passing the clamping nut 26 so that its portion 266 is accessible from the outside, even though the skirt 262 and the collar 264 are disposed inside the internal volume of the manifold 10. The portion of the clamping nut 26 that passes through the orifice 282 is provided with a peripheral groove 268 in which an O-ring seal 41 is disposed so as to provide sealing between the parts 26 and 28.

The third support 13C is disposed in a middle portion of the manifold 10 and its orifice 134 forms bearing for supporting an intermediate portion of the tie 14.

The body 124 of each outlet module 12 defines two opposite openings $O_1$ and $O_2$ that are axial and centered on the axis $X_{10}$, and that put its internal volume $V_{12}$ into communication with the internal volumes $V_{11}$ and/or $V_{12}$ of adjacent modules 11 or 12. The opening $O_1$ of a module 12 is edged by an "outer" skirt 126 that is annular and of circular section, and that has an inside radius referenced $R_{126}$. The opposite opening $O_2$ of a module 12 is edged by an "inner" second skirt 128 that is also annular and of circular section, and that has an outside radius referenced $R_{128}$. The value of the radius $R_{128}$ is slightly smaller than the value of the radius $R_{126}$ so that it is possible to engage the inner skirt 128 of one module 12 radially into the outer skirt 126 of an adjacent other module 12, when a stack of two modules 12 is formed.

Each inner skirt 128 is provided with an external peripheral groove 129 in which an O-ring seal 36 is disposed. This makes it possible to seal the assembly between two stacked-together modules 12, in the configuration shown in FIGS. 2 to 5.

When two adjacent modules 12 are in the stacked and compressed configuration, the radially inside surface of the outer skirt 126 of one module 12 surrounds the radially outside surface of the inner skirt 128 of an adjacent module 12. Reference $L_1$ designates the axial length, i.e. the length measured parallel to the axis $X_{10}$ of the overlap zone of the skirts 126 and 128 that is situated between firstly the edge of the groove 129 that is further from the free edge of the skirt 128 of one module 12 and secondly the free edge of the skirt 126 of an adjacent second module 12, when the manifold is in the stacked and compressed configuration. This axial length $L_1$ corresponds to the maximum spacing distance, with the sealing being maintained at the overlap zone of the two adjacent modules 12, when two modules 12 are spaced apart axially starting from this configuration. In other words, the length $L_1$ is the leaktight overlap length of two adjacent modules 12.

In the same way, the body 114 of the module 11 is provided with an outer skirt 116 and with an inner skirt 118 that are respectively of the same geometrical shape and of the same radial dimensions as the skirts 126 and 128. The inner skirt 118 is provided with an external peripheral groove 119 in which a seal 36 is also disposed. The inner skirt 118 of the module 11 is engaged into the outer skirt 126 of the adjacent module 12, as explained above for the internal and outer skirts of two adjacent modules 12. Reference $L_2$ designates that the leaktight overlap length defined as above, at the interface between the module 11 and the adjacent module 12. The length $L_2$ is measured axially between the further edge of the groove 119 of the inner skirt 118 and the free edge of the skirt 126 of the module 12 adjacent to the module 11.

A leaktight link band 38 is disposed between the module 11 and the support 13A, while being equipped with two O-ring seals 40 disposed in respective ones of two external peripheral grooves 382 and 384 in said ring 38. This band 38 is engaged inside the outer skirt 116 of the module 11, as would be an inner skirt 128 of a module 12, and inside an outer skirt 137 of the support 13A. When the manifold is in the stacked and compressed configuration, the band 38 is disposed axially between internal shoulders of the body 11 and of the support 13A. In this configuration, the skirt 116 of the module 11 covers the groove 382, while the skirt 137 of the support 13A covers the groove 384.

Figure 3:
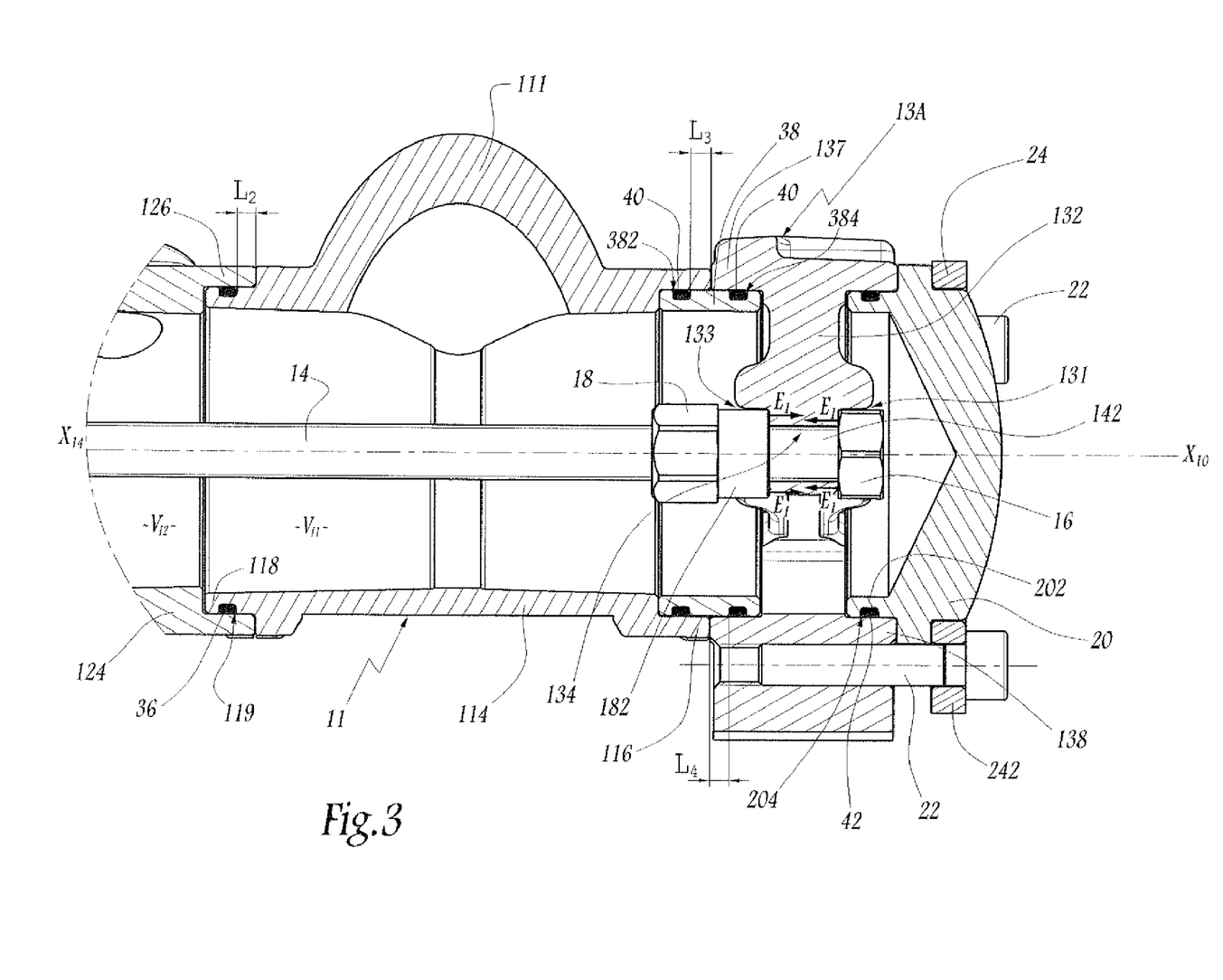
FIG. 3 is a view on a larger scale of the detail III of FIG. 2.
Figure 4:
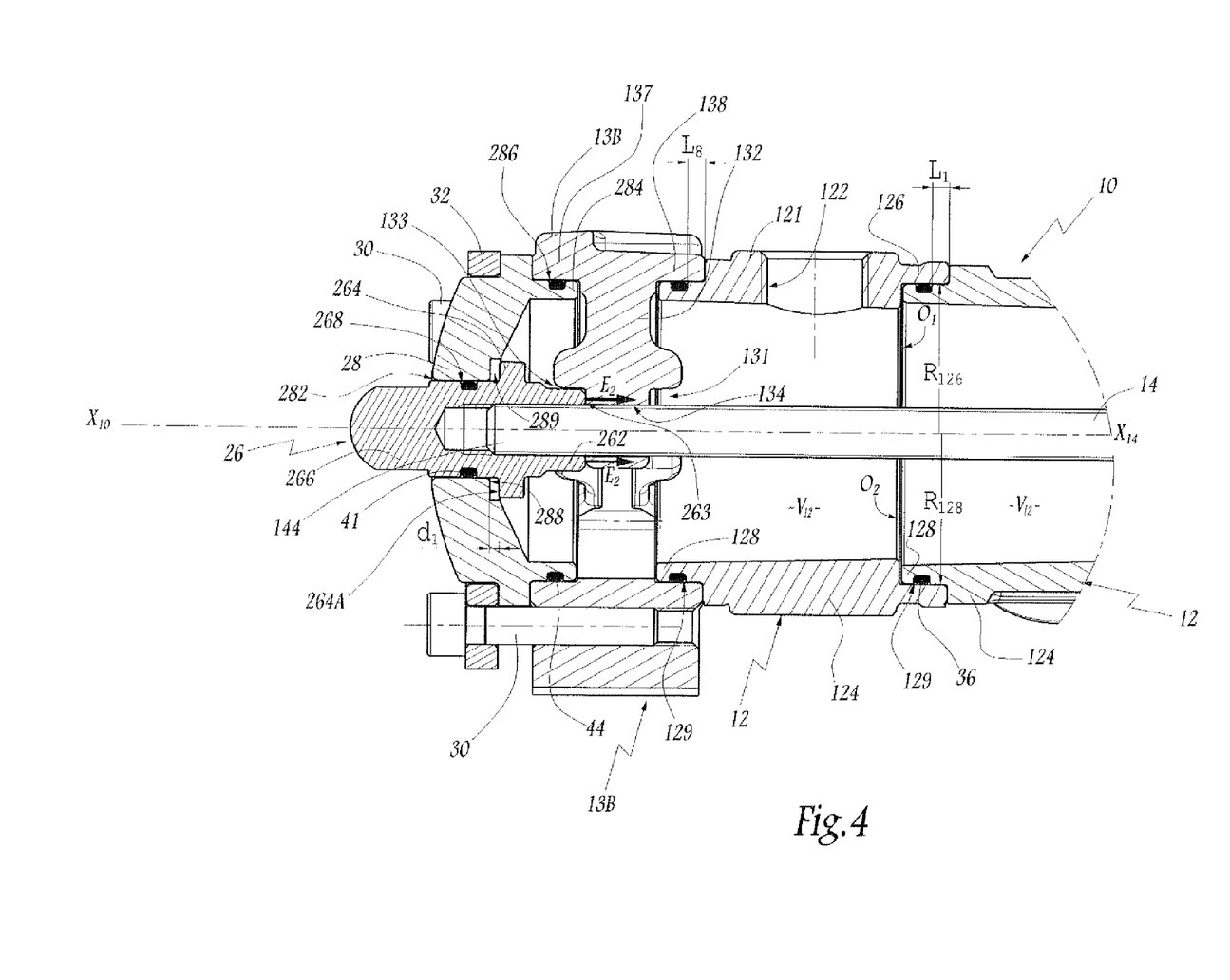
FIG. 4 is a view on a larger scale of the detail IV of FIG. 2.

Reference $L_3$ designates the leaktight overlap length of the module 11 and of the band 38 when the manifold 10 is in the stacked and compressed configuration. The length $L_3$ is measured axially between the edge of the groove 382 that is closer to the groove 384 and the free edge of the outer skirt 116 when the band 38 is in abutment against the corresponding internal shoulder of the support 13A. Reference $L_4$ designates the leaktight overlap length between the support 13R and the band 38 when the manifold 10 is in the stacked and compressed configuration. The length $L_4$ is measured axially between the edge of the groove 384 that is closer to the groove 382 and the free edge of the skirt 137 when the band 38 is in abutment against the corresponding shoulder of the module 11. In view of the manufacturing tolerances, the band 38 cannot be simultaneously in abutment on the shoulders of the module 11 and of the support 13A. The length $L_3$ as shown in FIG. 3 is thus approximate. The same applies to the length $L_5$ defined below and shown in FIG. 5.

The cap 20 is equipped with a skirt 202 that is engaged in the support 13A and that is provided with an external peripheral groove 204 in which an O-ring seal 42 is disposed. Similarly, the cap 28 has a skirt 284 that is provided with an external peripheral groove 286 in which an O-ring seal 44 is disposed. The skirt 202 is engaged in an outer skirt 138 of the support 13A.

Figure 5:
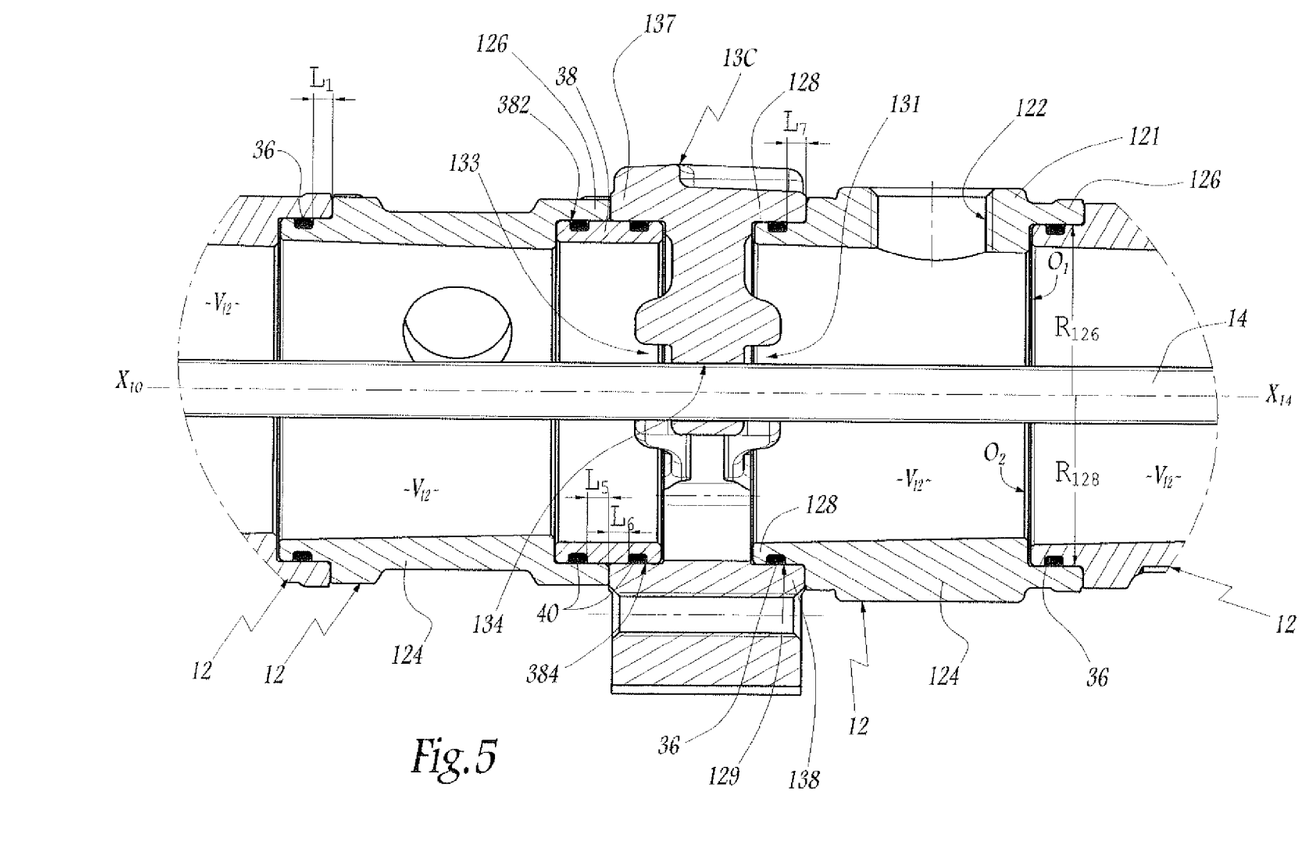
FIG. 5 is a view on a larger scale of the detail V of FIG. 2.

A second sealing band 38 identical to the first sealing band is disposed between the support 130 and the module 12 shown on the left of said support in FIG. 5, in a manner analogous to the band used in the vicinity of the support 13A, by being engaged into the respective outer skirts 126 and 137 of a module 12 and of the support 13C. The inner skirt 128 of the module 12 shown on the right of said support in FIG. 5 is engaged into the internal volume of the support 130, in the same way as the skirt 202 of the cap 20 is engaged into the internal volume of the support 13A. The skirt 284 of the cap 28 is engaged into the skirt 137 of the support 13B and the inner skirt 128 of a module 12 is engaged into the skirt 138 of said support.

The internal volume $V_{10}$ of the manifold is formed by the internal volumes $V_{11}$ and $V_{12}$ being united with the internal volumes of the bands 38, with the internal volumes of the supports 13A, 13B, and 13C, and with the internal volumes of the caps 20 and 28.

The openings $O_1$ and $O_2$ of the modules 12 make it possible to put their internal volumes also into communication with the internal volumes of the bands 38 and of the supports 13A, 13B, and 13C.

In a manner analogous to the manner mentioned above, the following leaktight overlap lengths are defined, these lengths being measured when the manifold is in the stacked and compressed configuration:

$L_5$: axial length measured between firstly the edge of the groove 382 of the second band 38 that is closer to the groove 384 in said band and secondly the free edge of the skirt 126 that covers said groove, when the band 38 is in abutment against the corresponding shoulder of the support 13C;

$L_6$: axial length measured between firstly the edge of the groove 384 in the second band 38 that is closer to the groove 382 in said band and secondly the free edge of the skirt 137 of the support 13C when the band 38 is in abutment against the corresponding shoulder of the module 12;

$L_7$: axial length measured between firstly the edge of the groove 129 that is further from the free edge of the inner skirt 128 of the module 12 engaged in the support 13C and secondly the free edge of the skirt 138 of the support 13C; and $L_8$: axial length measured between firstly the edge of the groove 129 that is further form the free edge of the skirt 128 of a module 12 engaged in the support 132 and secondly the free edge of the skirt 138 of said support;

The lengths L and $L_2$ have the same value, as do the lengths $L_3$ and $L_s$, the lengths $L_4$ and $L_6$, and the lengths $L_7$ and $L_8$. It is possible to make provision, by construction, for the values $L_i$ to have the same value, where i lies in the range 1 to 8. However, this is not essential.

The leaktight overlap lengths $L_1$ to $L_8$ may be defined in some other manner, so long as they correspond to an axial spacing length between two adjacent parts over which length leaktightness is guaranteed at the overlap zone of the two adjacent parts, starting from a stacked and compressed configuration of the manifold.

Reference $L_m$ designates the minimum leaktight overlap length, i.e. the leaktight overlap length that is the smallest from among the lengths $L_i$, where i lies in the range 1 to 8, i.e. form among the leaktight overlap lengths of each pair of adjacent parts of the stack.

When the supports 13A and 13B are pressed towards each other, the stack formed by the elements 11, 12, 13A, 13B, 13C, and 38 acts, by means of the volumes $V_{11}$ and $V_{12}$ being united, to constitute a duct for passing heat-transfer fluid between the branch stub 111 and the various branch stubs 121, the internal volume of said duct being isolated from the outside by the mutual leaktight overlapping of the skirts and of the corresponding portions of the elements 11, 12, 13A to 13C, and 38, and by the leaktight fastening of the parts 20 and 28, and by the corresponding seals 34, 36, 40, 42, and 44.

In order to exert a compression force on the stack, it suffices to screw the clamping nut 26 onto the end 144 of the tie 14 until the end annular face 263 of the skirt 262 exerts a compression force $E_2$ on the end wall of the recess 133, to which force a compression force (not shown) responds that is of the same strength and that is exerted by an assembly nut 16 on the end-wall of the recess 131 of the support 13A.

In this configuration, the compression force holds the various modules and supports stationary in rotation relative to one another, by friction, about the axes $X_{10}$ and $X_{19}$ that then coincide.

When assembling the manifold, firstly the tie 14 is secured to the support 13A, both in rotation and in translation, as explained above, by means of the assembly nut 16 and of the holding nut 18. Then, the following are put in place successively around the tie 14: a band 38, the module 11, five modules 12, the support 13C, a second band 38, six modules 12, and then the support 13B. Thus, a stack is constituted that comprises, inter alia, the module 11, a plurality of modules 12, and the support 13A. During these operations, the tie 14 is caused to pass successively through the internal volume $V_{11}$ or $V_{12}$ of each module 11 or 12, through the orifices 134 in the supports 13B and 13C, and inside the bands 38. The clamping nut 26 is then screwed onto the end 144, thereby making it possible to exert the compression force $E_2$ that puts the modules and supports into contact so as to lock them axially relative to one another and so as to hold the various modules stationary in rotation. It is then possible to put the caps 20 and 28 into place on the stack, by means of the respective screws 22 and 30, for sealing the manifold 10.

Each support 13A, 13B, and 13C is equipped with a soleplate 135 in which two notches are provided, only one of which is visible in FIG. 1 with the reference 136, it being understood that a notch of the same type is disposed for each support 13 symmetrically relative to the section plane of FIG. 2. These notches 136 make it possible to fasten the supports 13A, 13B, and 13C, and thereby the manifold 10 in the stacked and compressed configuration, to a carrier structure such as a table 200 by means of screws 201 shown by lines indicating their axes. Thus, the supports 13A, 13B, and 130 are fastened together when the manifold 10 is mounted on the table 200.

When the relative angular positioning of the various modules 11 and/or 12 is to be adjusted relative to the table 200, in particular to take account of a change in the distribution of the molds 2 in the environment of the manifold 10, it is possible to loosen the clamping nut 20 until its collar 264 comes into abutment against an abutment 288 formed by the portion of the cap 28 that surrounds the orifice 282 on the inside, i.e. on the side of the cap that faces towards the support 13B. A counterbore 289 is provided around the orifice 282, on the inside of the cap 28, and it makes it possible to receive a portion of the collar 264. Reference $d_1$ designates the axial distance, measured parallel to the axes $X_{10}$ and $X_{14}$ between firstly the radial surface 264A of the collar 264 facing towards the counterbore 289 and secondly the end-wall of the counterbore 289 when the stacking compression force $E_2$ is exerted by the clamping nut 26. In other words, the radial surface 264A extends at the distance $d_1$ from the abutment 288 when the manifold 10 is in the stacked and compressed configuration.

When the manifold 10 is mounted on the table 200 as explained above, the abutment 288 that is stationary relative to the support 13B is also stationary relative to the support 13A.

The geometrical shapes of the component parts of the manifold 10 are chosen so that the distance $d_1$ is less than the minimum leaktight overlap length $L_m$.

The loosening stroke over which the clamping nut 26 can be loosened relative to the tie 14 is limited by the collar 264 coming into abutment against the abutment 288, i.e. against the end-wall of the counterbore 289 that forms a seat for receiving and for bearing against the collar 264. This loosening stroke thus has a maximum length equal to the distance $d_1$. This possibility for partially loosening the clamping nut 26 even though the caps 20 and 28 of the manifold 10 remain in place on the manifold, makes it possible to reduce and then to eliminate the force $E_2$.

If, after the nut 26 has been loosened and moved into contact with the abutment 28, one of the supports 13A or 13B or all of the supports is/are released from the table 200, the relative axial spacing between two parts of the stack is limited on one side by the assembly nut 16 that remains constrained in translation with the tie 14, and on the other side by the support 13B coming into abutment against the end annular face 263 of the clamping nut 26 that remains engaged with the tie. Since the clamping nut 26 has been moved from its tightened position shown in FIG. 4 to its abutment position in which the surface 264A bears against the abutment 28, over the distance $d_1$ along the axis $X_{14}$ and relative to the radial surface of the nut 16 that is in contact with the support 13A, the maximum relative axial spacing between two parts of the stack is less than said distance $d_1$.

Insofar as the value of the distance $d_1$ is less than the value of the length $L_m$, the loosening of the clamping nut 26 makes it possible to space two adjacent parts 11, 12, 13A to 13C or 38 apart axially over an axial distance such that each pair of parts of the stack remains in leaktight overlap. This partial loosening does not therefore break the sealing of the isolation between the internal volume $V_{10}$ of the manifold 10 and its outside environment. However, such loosening strongly reduces the friction force between two adjacent parts. It is thus possible to modify the relative angular positioning of one or more of the modules 11 and 12 without having to empty the manifold, which is entirely advantageous in terms of simplicity and of convenience.

Once the desired angular configuration of the various modules 11 and 12 has been obtained, it is possible to tighten the clamping nut 26 again so as to obtain a compression force $E_2$ that imparts durability to the sealing of the isolation between the internal volume $V_{10}$ of the manifold 10 and its outside environment and that holds the various modules stationary in rotation relative to the axis $X_{10}$. In other words, tightening the clamping nut 26 again locks the modules 11 and 12 in translation and in rotation relative to the supports 13A, 13B, and 13C, and thus relative to the table 200 when said supports are secured to the table.

Figure 6:
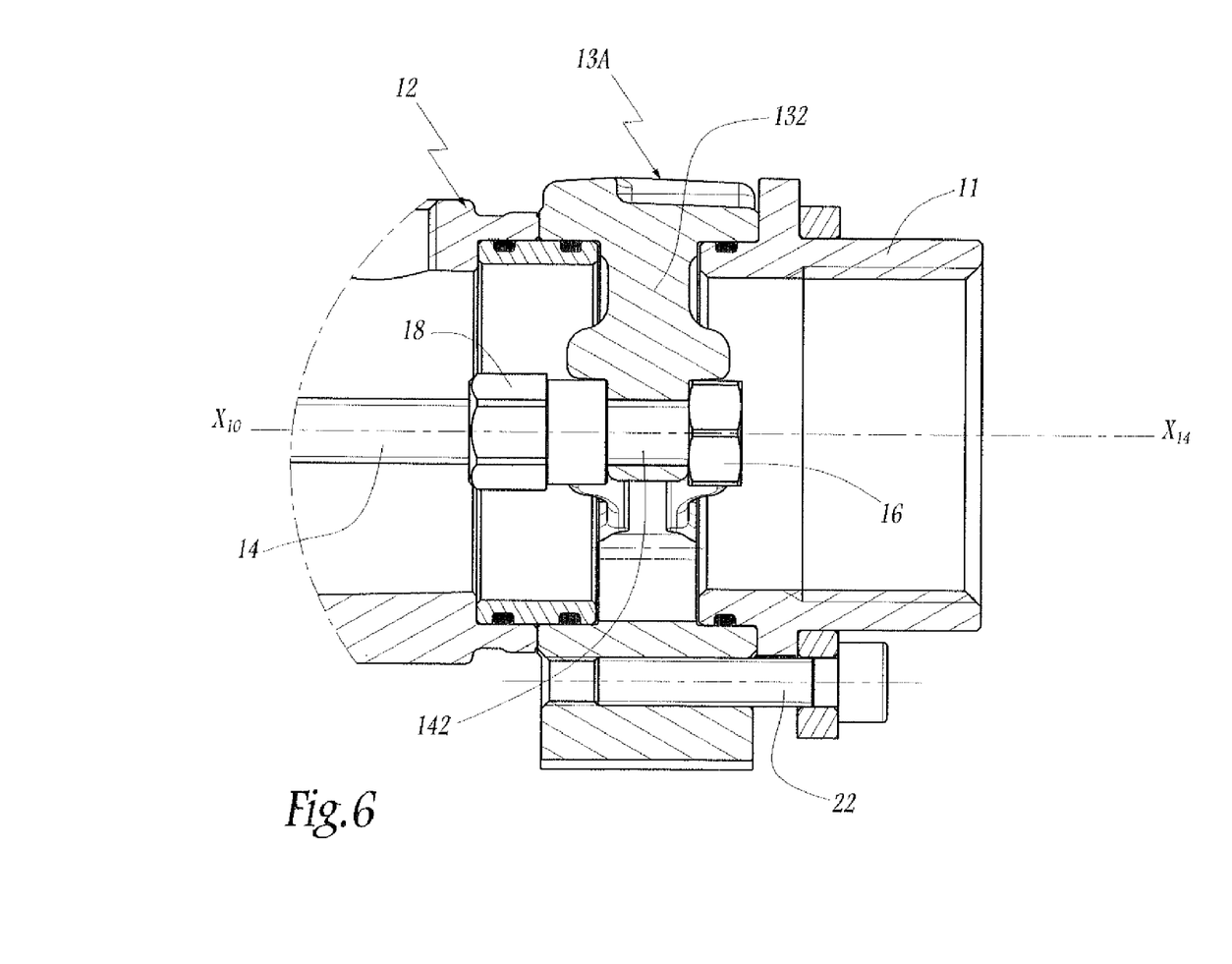
FIG. 6 is a view analogous to FIG. 3, for a second embodiment of a manifold of the invention.

In the second embodiment of the invention shown in FIG. 6, the elements analogous to the elements of the first embodiment bear like references. In the description below, only that which distinguishes this embodiment from the first embodiment is described. In this embodiment, the inlet orifice of the inlet module 11 is axial, i.e. parallel to the longitudinal axis $X_{10}$ of the manifold 10, whereas the outlet orifices of the outlet modules 12 are radial.

This embodiment assumes that the rib 132 of the support 13A is sufficiently perforated to enable the fluid flowing through the manifold 10 to pass without generating over-large head loss. The inlet module 11 is held stationary in leaktight manner on the support 13A by means of screws 22, as explained for the cap 20 in the first embodiment. This module 11 is not part of the stack of modules and of supports that can be compressed. The angular positioning of the module does not need to be adjusted because its branch stub is axial.

Figure 7:
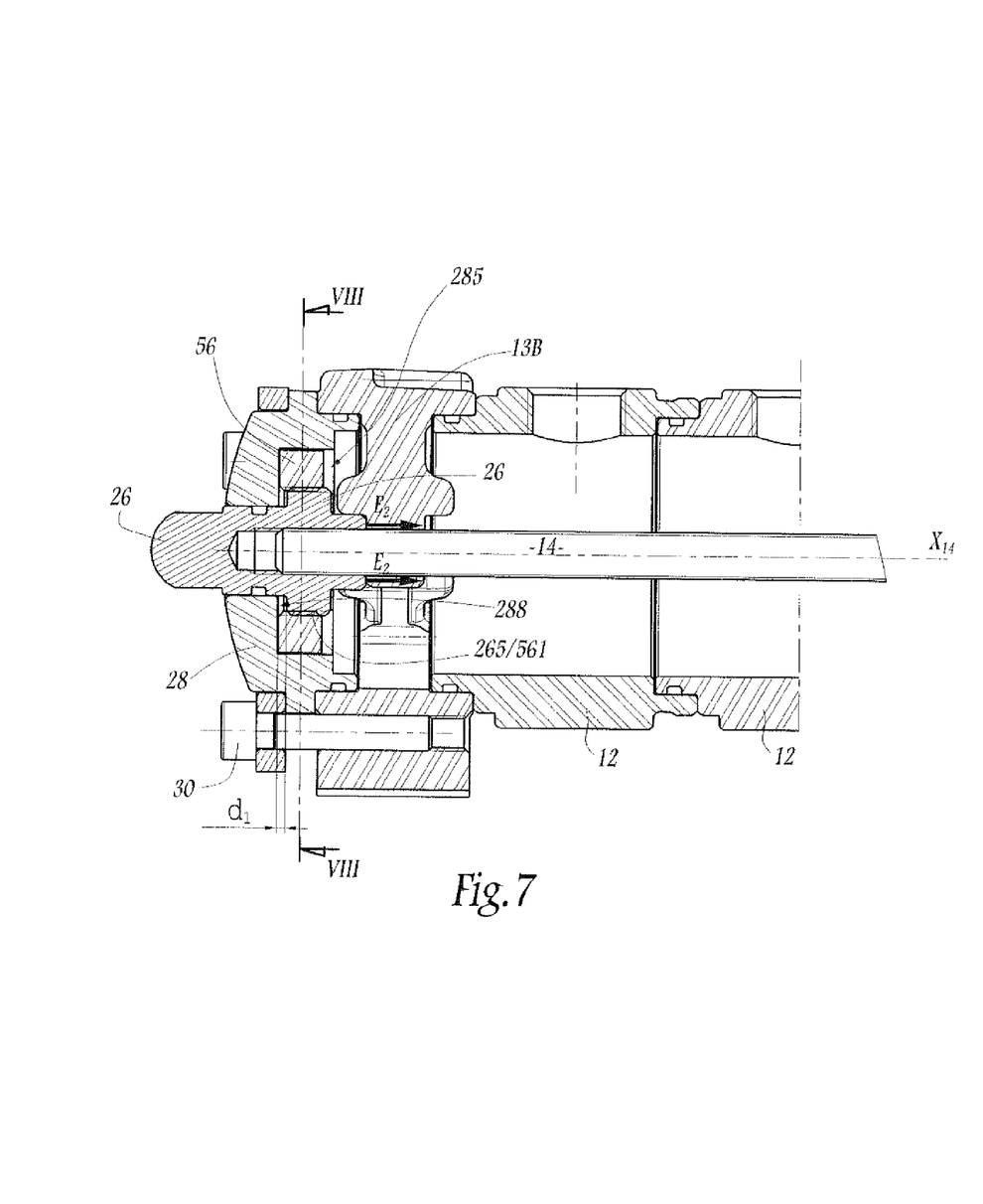
FIG. 7 is a view analogous to FIG. 4, for a third embodiment of a manifold of the invention.
Figure 8:
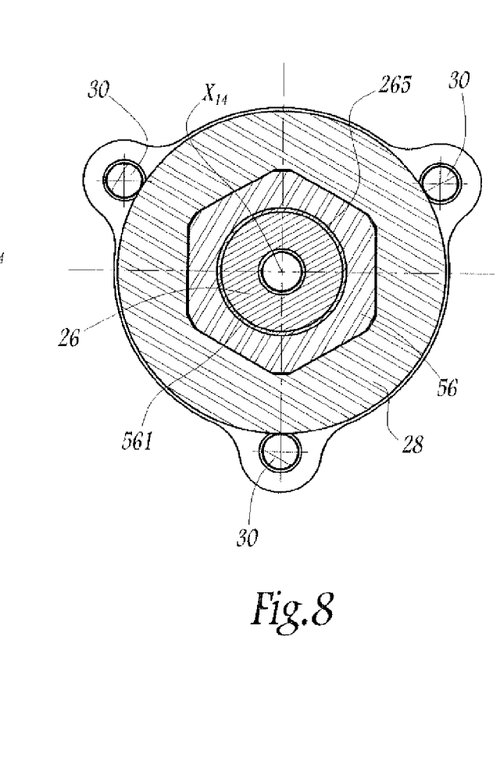
FIG. 8 is a section on line VIII-VIII of FIG. 7.

In the third embodiment of the invention that is shown in FIGS. 7 and 8, the elements analogous to the elements of the first embodiment bear like references. In the description below, mainly that which distinguishes this embodiment from the first embodiment is described. Otherwise, the embodiments are identical. The clamping nut 26 is provided with an outside thread 265 that co-operates with an inside thread 561 of a stop nut or locknut 56 of polygonal outside cross-section, this cross-section being hexagonal in the example shown. The pitch of the inside thread and the pitch of the outside thread of the clamping nut 26 are identical.

When assembling the manifold 10, the support 13B is put in place around the tie 14 and the clamping nut 26 is tightened to exert the compression force $E_2$ on the stack of modules and of supports. The locknut 56 is then put into place in a recess 285 of corresponding shape provided in the face of the cap 28 that faces towards the support 13B. In this example, the recess 285 is of hexagonal section that is complementary to the outside section of the locknut 56. The locknut 56 is then in abutment against the end-wall of the recess 285. The assembly formed of the parts 28 and 56 is then screwed around the clamping nut 26 until the cap 28 comes axially into contact with the support 13B. The cap 28 is then held stationary on the support 13B via three screws 30.

When the clamping nut 26 is loosened, said clamping nut is in engagement with the thread 261 of the locknut 56 and, when the clamping nut 26 comes into contact with the abutment 288 formed by the cap 28, the locknut 56 that is held stationary in rotation about the axis $X_{14}$ in the recess 285 by shape co-operation with the cap 28, itself constrained in rotation with the support 13B fastened to the table 200, opposes rotation of the clamping nut 26 and thus constitutes a clear-cut abutment for stopping the loosening of the clamping nut 26.

To disassemble the manifold 10 completely, it is necessary to remove the cap 28 and the locknut 56, by unscrewing the assembly formed by these two parts relative to the clamping nut 26, or by removing the cap 28 and then by unscrewing the locknut 56.

In the three embodiments described, the number and the distribution of the inlet and outlet modules 11 and 12 may be modified relative to what is shown. In particular, in the first embodiment, the inlet module 11 is not necessarily disposed in the vicinity of the first support 13A.

Regardless of the embodiment, after the clamping nut 26 has been loosened to the abutment 288, the angular positioning of the various modules can be modified without any risk of leakage even though the manifold is full, i.e. without it being necessary to empty it, thereby saving time and making the operation very simple. In addition, in order to break the sealing of the manifold, i.e. in order to put its internal volume $V_{10}$ into communication with the outside, it is necessary to remove one of the caps 20 and 28 by removing the various screws 22 or 30. In order to disassemble the manifold 10 completely, the cap 28 is removed and the clamping nut 26 is loosened to beyond the position reached when its collar 264 comes into contact with the abutment 288. The operation of opening the manifold 10 is thus relatively elaborate, which makes it possible to avoid the risks of accidental and unintentional disassembly of the manifold while said manifold is full.

Since the tie 14 is disposed inside the manifold, it is protected from unintentional snagging, thereby guaranteeing that the manifold is safely assembled when it is full. The tie 14 is also protected from chemical attack. In addition, since the tie 14 is disposed in a central position inside the manifold 10 along the axis $X_{10}$, it is possible to adjust the angular position of each of the modules 11 and 12 through 360° around said tie.

In a variant of the invention (not shown) that is applicable to all of the embodiments, the means for holding the first end 142 of the tie 14 stationary in rotation and in translation on the support 13A may be constituted by providing a thread inside the orifice 134, thereby making it possible to omit the assembly nut 16.

The invention is shown when an intermediate support 13C is used. However, this is not essential, in particular when the number of modules 11 and 12 is relatively small, so that there is no risk of the stack deforming between its two end supports.

The invention is shown when the three supports 13A, 13B, and 130 used are identical. This is advantageous in terms of manufacturing, but it is not however essential.

The end supports 13A and 13B, or only one of them, may be constructed so that they seal the end of the manifold 10 without requiring use of a cap to perform that function. In which case, sealing means are provided between the end through which the tie passes and said tie, and the abutment can be mounted on the second support 13B in a manner otherwise than shown in FIG. 4, in order to limit loosening of the clamping nut 26.

The invention is shown when the manifold is operating to distribute a fluid that flows from an inlet module 11 towards a plurality of outlet modules 12. The manifold can also be used to collect fluid that then flows from each of the modules 12 that constitute inlet modules towards the module 11 which constitutes the outlet module of the manifold.

The invention is shown in the figures when the seals 36 and 40 are disposed in grooves 119, 120, and 382 provided in the radially outside surfaces of the inner skirts 118 and 128 of the bands 38. In a variant, the grooves for receiving some or all of the seals may be provided on the radially inside surfaces of the outer skirts 116, 126, 137 and/or 138. The definition of the leaktight overlap lengths is then adapted.

The invention is shown in the figures when the tie 14 is constrained in rotation and in axial translation with the first support 13A. In a variant, the tie may be constrained in rotation relative to a support, e.g. the support 130, and in axial translation relative to the support 13A, both of these supports being fastened to the table 200. In which case, the tie is also fastened both in rotation and in translation relative to each of the supports.

In another variant, the tie 14 can be prevented from moving in translation, in a direction parallel to its axis, relative to the support 13A and held in abutment, in the other direction, against the cap 20. The tie 14 is then prevented from moving in rotation in the support 13A by accessory means, such as a key or a cotter pin.

In yet another variant, the tie 14 may be constrained in rotation with the intermediate support 13C, whereas two clamping nuts 26 and abutments 288 are provided in the vicinities of respective ones of its two ends 142 and 144.

The invention claimed is:

1. A manifold for distributing or for collecting fluid, said manifold comprising:
    a stack formed by at least a plurality of tubular modules and a first support; and
    at least one tie for compressing the stack in a configuration in which central internal volumes of the various modules are in mutual communication, with adjacent parts of the stack overlapping in leaktight manner, and in which the relative position of two adjacent modules is stationary, said manifold being wherein
    the tie is suitable for being fastened, in rotation about its longitudinal axis ($X_{14}$) and in translation parallel to said axis, relative to the first support;
    at one end, the tie is equipped with a clamping nut that, in the tightened position, exerts a compression force on the stack of modules and of the first support; and
    an abutment, suitable for being fastened axially relative to the first support and for bearingly receiving a surface of the clamping nut when said clamping nut is actuated in the loosening direction, is disposed, relative to the surface of the clamping nut in the tightened position, at an axial distance less than the smallest of the leaktight overlap lengths of two adjacent parts of the stack.

2. A manifold according to claim 1, wherein the surface of the clamping nut bears against the abutment in a position in which the modules can turn, relative to the support and/or relative to one another, about an axis parallel to the longitudinal axis of the tie, while the adjacent parts of the stack overlap in leaktight manner.

3. A manifold according to claim 1, wherein the leaktight overlap between two adjacent parts is implemented by an outer annular skirt of a first part surrounding an inner annular skirt of a second part adjacent to the first part, with at least one seal being interposed by being disposed in a groove provided in one of the radial surfaces facing the outer skirt and the inner skirt.

4. A manifold according to claim 1, wherein the tie is disposed inside the internal volume of the manifold and passes through the internal volumes of the modules.

5. A manifold according to claim 1, wherein the stack further comprises a second support suitable for being fastened relative to the first support, and wherein the abutment is secured to the second support, at least parallel to the longitudinal axis of the tie.

6. A manifold according to claim 5, wherein a cap mounted on the second support is provided with an orifice for passing the clamping nut, wherein the abutment is formed by a seat provided around the orifice, on the side of the cap that faces towards the second support, and wherein said seat is suitable for bearingly receiving a surface of a radially outer collar of the clamping nut.

7. A manifold according to claim 5, wherein it further comprises a third support for the tie, which support is disposed in an intermediate portion of the manifold, within the stack of modules.

8. A manifold according to claim 1, wherein the clamping nut is screwed into a locknut that is held stationary in rotation about the axis of rotation of the clamping nut.

9. A manifold according to claim 1, wherein the first support, and optionally the second support and/or the third support is/are provided with means for fastening to a supporting structure.

10. A manifold according to claim 1, wherein the tie is mounted on the first support by means of
    an assembly nut screwed onto the tie, of polygonal outside shape and that is held stationary by complementary shapes in a corresponding recess in the first support; and by means of
    a holding nut screwed onto the tie and suitable for acting, with the assembly nut, to exert a pinching force for pinching a portion of the first support between these two nuts.

11. A molding installation comprising at least one mold fed with heat-transfer fluid by a fluid circulation system, wherein it further comprises at least one manifold according to claim 1 that is fastened to a supporting structure.

* * * * *